United States Patent [19]

Baumann

[11] 3,895,557

[45] July 22, 1975

[54] ROCKET LAUNCHER MOUNT

[75] Inventor: Emil Baumann, Niederglatt, Switzerland

[73] Assignee: Contraves AG, Zurich, Switzerland

[22] Filed: Nov. 23, 1973

[21] Appl. No.: 418,616

[30] Foreign Application Priority Data
Dec. 4, 1972 Switzerland...................... 17614/72

[52] U.S. Cl.................. 89/1.815; 89/40 J; 89/36 G
[51] Int. Cl............................................. F41f 3/04
[58] Field of Search...... 89/40 J, 1.815, 36 R, 40 R, 89/37 R, 36 H, 36 G, 37.5 R, 37.5 A

[56] References Cited
UNITED STATES PATENTS

| 1,083,846 | 1/1914 | Markson............................. 89/36 F |
| 2,981,150 | 4/1961 | Miller, Jr. .......................... 89/1.815 |
| 3,396,629 | 8/1968 | Faisandier......................... 89/1.815 |
| 3,662,647 | 5/1972 | King................................... 89/40 J |

FOREIGN PATENTS OR APPLICATIONS

| 290,022 | 4/1953 | Switzerland........................ 89/1.815 |
| 336,724 | 4/1959 | Switzerland......................... 89/40 J |

Primary Examiner—Robert F. Stahl
Attorney, Agent, or Firm—Werner W. Kleeman

[57] ABSTRACT

A mobile rocket launcher mount equipped for travel and firing operations wherein two rocket launchers, each accommodating a plurality of rockets, and driven to be pivotable about a respective horizontal pivot axis are mounted at the outside of a respective side door of a substantially box-like housing, and which side doors are pivotable about substantially vertical axis hinges. The housing, in which there are accommodated one or more seats and actuation devices for the operating personnel and equipped with observation- and target tracking devices, is mounted as a unit so as to be rotatable about a vertical axis of rotation at the mount chassis.

10 Claims, 6 Drawing Figures

ROCKET LAUNCHER MOUNT

FIELD OF THE INVENTION

The present invention relates to a mobile rocket launcher mount equipped to carry out traveling and firing operations.

SUMMARY OF THE INVENTION

It is a primary object of the invention to provide an improved construction of rocket launcher mount wherein the operating personnel, after transport of the mobile rocket launcher mount into the firing position, can undertake battle functions against ground and/or air targets without additional auxiliary devices for the observation and tracking of targets and if desired also without external energy supply and wherein the operating personnel can operate in a protected housing compartment.

Another significant object of the present invention relates to an improved construction of mobile rocket launcher mount which is relatively simple in construction and design, effectively carries out its battle functions, and provides a protected area for the operating personnel.

Now in order to implement these and still further objects of the invention, which will become more readily apparent as the description proceeds, the mobile rocket launcher mount of this development is manifested by the features that two motor driven rocket launchers, each accommodating a plurality of rockets, and each pivotable about a respective horizontal pivot axis are mounted at the outside of a respective side door of a substantially box-shaped housing, which side doors are each pivotable about substantially vertical hinges, and further, this housing, within which there are accommodated seats and actuation devices for the operating personnel and equipped with observation- and target tracking devices, is mounted to be motor driven for rotation as a unit about a substantially vertical axis of rotation at the mount chassis.

The mounting of the rocket launchers in pivotable side doors of a closed housing compartment provides for the operating personnel a comfortable possibility of climbing into and out of the housing compartment and provides favorable prerequisites for this activity during the firing operation.

According to a further aspect of the invention there is advantageously pivotably supported at each side door a cylinder for a hydraulically actuated piston for pivoting the associated rocket launcher. Moreover, the mount chassis is equipped with hydraulic actuatable wheels which can be tilted or pivoted upwardly out of their travel position and with overhanging beams or arms each equipped with hydraulically retractable or lowerable supports, and which overhang beams or arms can be rocked out of their travel position into their firing position.

Apart from the foregoing, it is also advantageous to provide an energy supply device equipped with an internal-combustion engine at the mount chassis for driving a current generator and there is also provided an hydraulic pump serving to supply the hydraulic adjustment devices.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
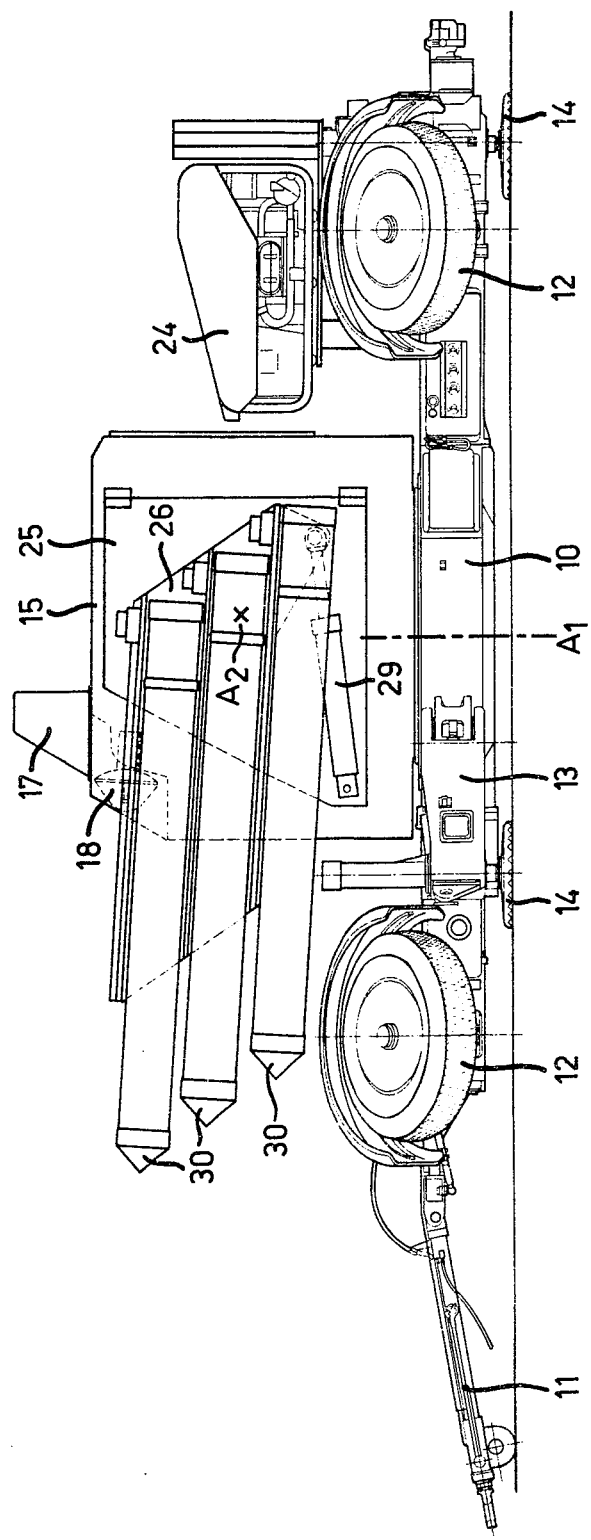
FIG. 1 is a side view of a mobile rocket launcher mount designed according to the present invention and depicted in its firing position.
Figure 2:
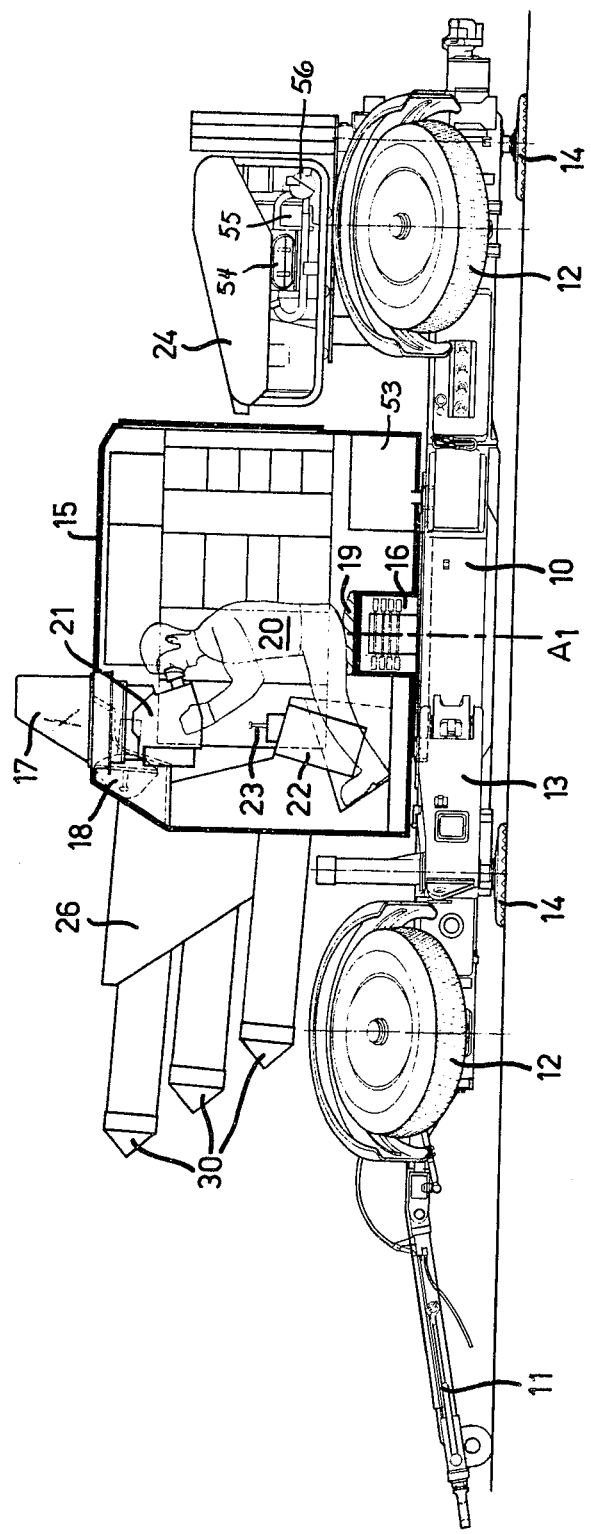
FIG. 2 is a side view of the rocket launcher mount shown in FIG. 1 with a side door or panel removed for the purpose of exposing internal structure.
Figure 3:
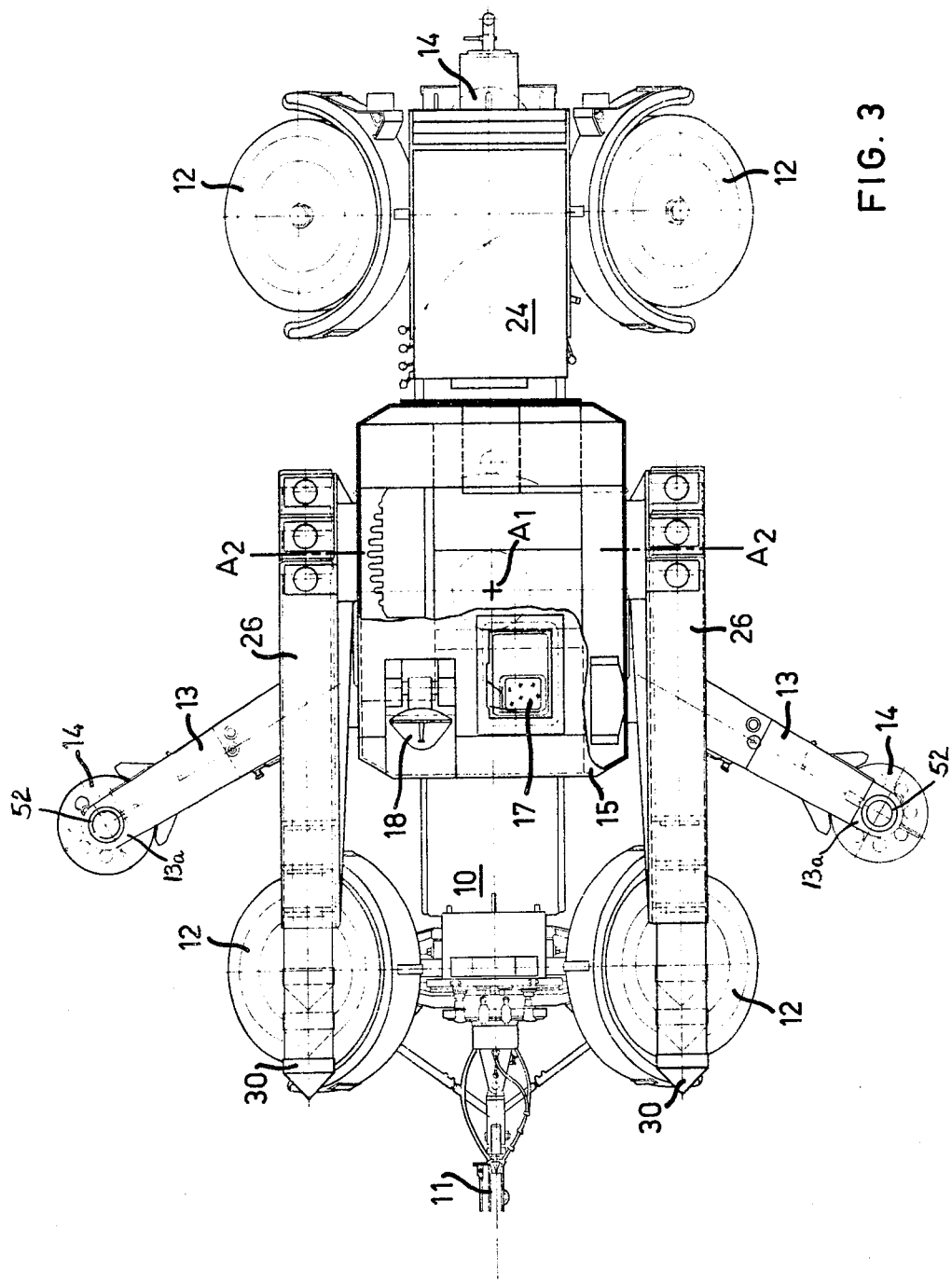
FIG. 3 is a top plan view of the mobile rocket launcher mount depicted in FIG. 1.
Figure 4:
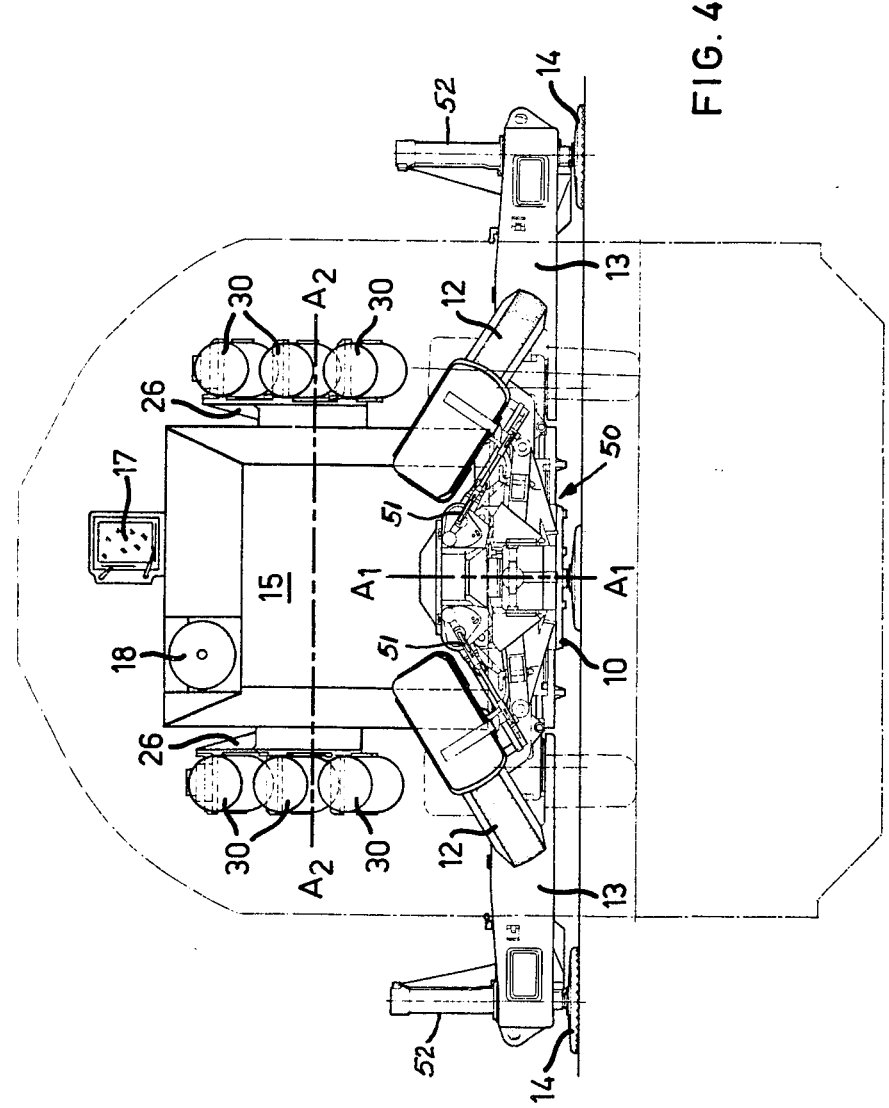
FIG. 4 is a front view thereof.
Figure 5:
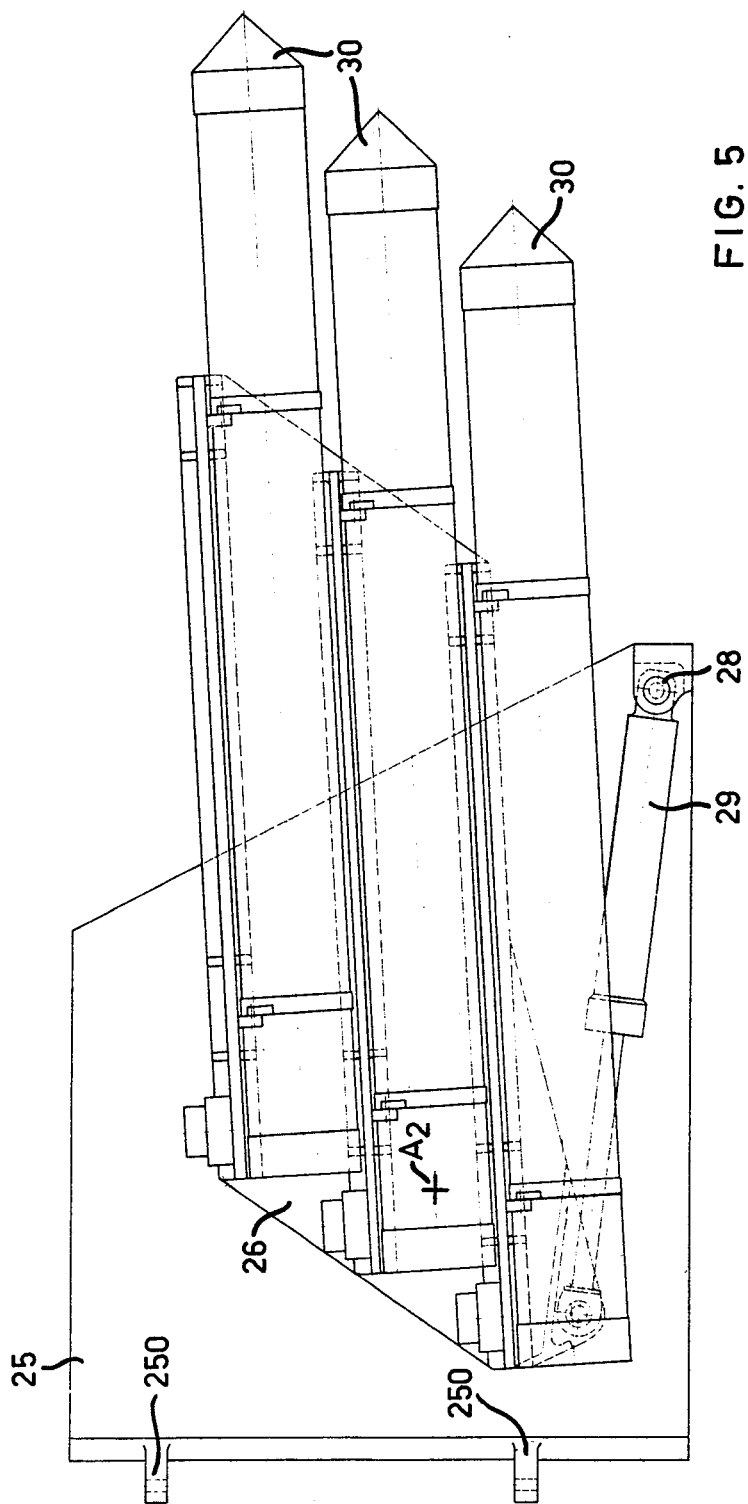
FIG. 5 is an enlarged side view of the housing door with a rocket launcher mounted thereat.
Figure 6:
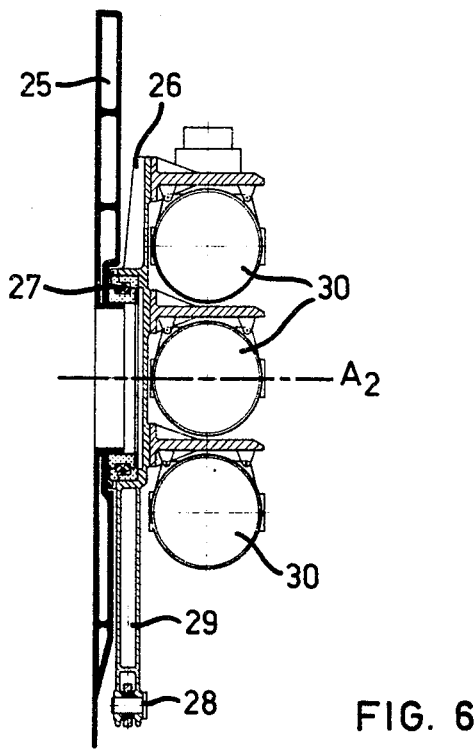
FIG. 6 is a vertical sectional view of the arrangement of FIG. 5.

Describing now the drawings, in FIGS. 1–6 there is depicted a preferred constructional embodiment of mobile rocket launcher mount designed according to the teachings of the present invention wherein reference numeral 10 designates a rigid chassis construction of such rocket launcher mount and equipped with a center pole 11 or equivalent structure for connecting the mount chassis 10 with any suitable traction vehicle. The mount chassis 10 is also provided with four wheels 12 to permit such to be conveniently drawn along the ground by the tractor vehicle and to render the rocket launcher mount mobile. These traveling wheels 12 have been depicted in FIGS. 1–4 in a retracted position, conveniently referred to herein as the retracted firing position, which such assume when the rocket launcher mount is set up in its firing position for engaging in battle in the manner depicted. The wheels 12 can be retracted into such firing position by means of any suitable wheel retraction mechanism, for instance the hydraulically actuatable wheel operating mechanism, generally indicated by reference numeral 50 and incorporating the hydraulically actuatable rods 51, as best seen by referring to FIG. 4. Hence, the wheels 12 can be shifted from their phantom line travel position into the full line retracted position as depicted in FIG. 4, and vice versa. At the ends 13a of two overhang beams or arms 13, which for travel of the rocket launcher mount assume a retracted position, but have been shown in FIGS. 1–4 in their extended or pivoted-out position which such beams or arms assume when the rocket launcher mount is set up in its firing position and at the rear end of the chassis construction 10 there are mounted supports 14 which can be for instance hydraulically downwardly extended or retracted by the schematically depicted actuation or displacement mechanisms 52. When the overhang beams 13 are pivoted-out into the position depicted in FIGS. 1–4, with the supports 14 bearing against the ground, such then support the entire mount and also permit horizontal leveling thereof.

A housing 15, preferably possessing a substantially box-shaped configuration, is rotatably mounted for movement through the agency of a suitable drive, such as the schematically depicted servomotor drive 53, at the chassis 10 for rotational movement about a vertical axis of rotation $A_1$ which is oriented transverse to the mount chassis 10, in other words rotatable in the azimuth direction. A slip ring mechanism 16, best seen by referring to FIG. 2, allows the infeed of supply and control currents to the housing 15 irrespective of the random position of such housing. The housing 15 is equipped with a periscope 17, the viewing direction of which relative to the housing can be freely adjusted as desired, in that for instance an objective mirror prism can be appropriately pivoted. Furthermore, in the housing 15 there is mounted the antenna 18 of a guide command transmitter.

Internally of the housing 15 there are provided one or a number of seats 19, as required, for one or two operating personnel 20. Within this housing 15 there is also provided the ocular 21 for the optical sighting of a target, an operating console or desk 22 which, if desired, can contain a radar screen, a control handle or rod 23 for adjusting the periscope 17, i.e. bringing a moving target into coincidence with the target flight path of a controllable rocket or missile.

The mobile rocket launcher mount is further equipped with an energy supply housing 24 which contains for instance a suitable propulsion motor, for instance an internal combustion engine 54 operating a current generator 55 and a hydraulic pump 56 serving as the source of pressurized medium for the hydraulically actuatable adjustment or displacement devices.

At two side doors or panels 25 of the housing 15, and which doors are laterally secured for pivotable movement at opposed sides of the housing 15 by means of vertical hinges 250, there are mounted via the bearings 27 (see also FIG. 6) rocket launchers 26 at coaxially aligned horizontal axes. Each of these rocket launchers 26 is capable of accommodating a plurality of rockets or missiles. Further, each such rocket launcher 26 can be conjointly adjusted to a selected elevational position for firing by means of an associated hydraulically actuatable hydraulic piston and cylinder unit 29 which is pivotably connected at the associated support bearing 28. Each rocket launcher 26, as shown in the drawings, is capable of handling three rockets 30. These rockets can be ballistic, non-controlled flying rockets or guidable rockets equipped with a receiver for receiving guide signals from the antenna 28, and which rockets are guided towards the target by means of an associated fire control device or by the operating personnel 20.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A mobile rocket launcher mount comprising a chassis equipped with wheels for permitting travel of the chassis, a housing having pivotal side doors, means for mounting said side doors for pivotable movement about substantially vertically extending hinge axes at the housing, a respective rocket launcher for accomodating a plurality of rockets mounted at each side door for pivotable movement about a respective horizontal pivot axis.

2. A mobile rocket launcher mount as defined in claim 1, including means for rotatably mounting said housing as a unit at the chassis for rotation about a substantially vertical axis of rotation.

3. The mobile rocket launcher mounted as defined in claim 1, further including means for pivoting said rocket launchers.

4. The mobile rocket launcher mounted as defined in ciaim 1, wherein said housing possesses a substantially box-shaped configuration.

5. The mobile rocket launcher mounted as defined in claim 4, wherein said housing is provided with an internal compartment equipped with at least one seat for an operator and with actuating means and observation- and target tracking means.

6. The mobile rocket launcher mounted as defined in claim 1, further including a hydraulically actuatable piston-cylinder unit hingedly supported at each side door for pivoting the associated rocket launcher.

7. The mobile rocket launcher mounted as defined in claim 6, further including wheels provided for the chassis to render the same mobile, and actuating means for rocking said wheels out of their travel position upwardly into a firing position for the rocket launcher mount, overhang beam means provided with supports for supporting the chassis when the wheels are retracted, said overhang beam means being selectively extendible or retractable towards and away from the housing.

8. The rocket launcher mounted as defined in claim 7, wherein said means for pivoting said wheels comprises hydraulic actuating means.

9. The rocket launcher mounted as defined in claim 7, further including energy supply means mounted at the chassis.

10. The rocket launcher mounted as defined in claim 9, wherein said energy supply means includes an internal-combustion engine for driving a current generator and a hydraulic pump for supplying the hydraulic actuating means.

* * * * *